United States Patent
Dong et al.

(10) Patent No.: US 11,955,673 B1
(45) Date of Patent: Apr. 9, 2024

(54) SYSTEMS AND METHODS FOR MONITORING FUEL CELL MEMBRANE DEGRADATION

(71) Applicants: Dongmei Dong, Miami, FL (US); Shekhar Bhansali, Miami, FL (US); Tinsley Benhaddouch, Miami, FL (US); Christopher Metler, Miami, FL (US); John Marcial, Miami, FL (US); Justin Fuentes, Miami, FL (US)

(72) Inventors: Dongmei Dong, Miami, FL (US); Shekhar Bhansali, Miami, FL (US); Tinsley Benhaddouch, Miami, FL (US); Christopher Metler, Miami, FL (US); John Marcial, Miami, FL (US); Justin Fuentes, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 18/459,748

(22) Filed: Sep. 1, 2023

Related U.S. Application Data

(62) Division of application No. 18/152,989, filed on Jan. 11, 2023, now Pat. No. 11,811,116.

(51) Int. Cl.
*H01M 8/04* (2016.01)
*H01M 8/04664* (2016.01)
*H01M 8/04992* (2016.01)

(52) U.S. Cl.
CPC ... *H01M 8/04992* (2013.01); *H01M 8/04671* (2013.01)

(58) Field of Classification Search
CPC ......... H01M 8/04992; H01M 8/04671; H01M 8/0447; H01M 8/04805; H01M 8/04798; H01M 8/04455; H01M 8/043; H01M 8/04302; H01M 8/04303; H01M 8/04089
See application file for complete search history.

(56) References Cited

U.S. PATENT DOCUMENTS

| | | | |
|---|---|---|---|
| 2014/0272630 A1* | 9/2014 | Nolan | H01M 8/04126 429/413 |
| 2016/0197366 A1* | 7/2016 | Pace | H01M 8/04895 429/446 |
| 2021/0143457 A1* | 5/2021 | Jeong | H01M 8/04664 |

FOREIGN PATENT DOCUMENTS

| | | |
|---|---|---|
| CN | 203326037 | 12/2013 |
| DE | 102015007798 | 12/2016 |
| JP | 2008103117 | 5/2008 |

\* cited by examiner

*Primary Examiner* — Raymond Alejandro
(74) *Attorney, Agent, or Firm* — Saliwanchik, Lloyd & Eisenschenk

(57) ABSTRACT

Systems and methods for real-time continuous monitoring of fuel cell membrane degradation are provided. At least one microsensor can be used as an inline sensor integrated at the cathode exhaust and/or the anode exhaust of a fuel cell, such as a proton exchange membrane fuel cell (PEMFC)). The microsensor can monitor the PEMFC degradation status by sensing the emission of fluoride.

20 Claims, 9 Drawing Sheets

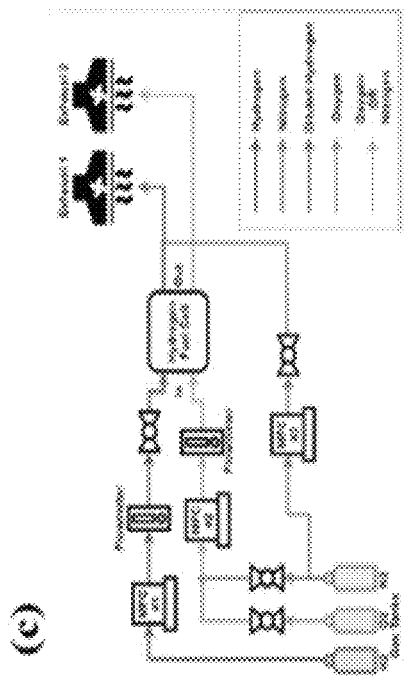
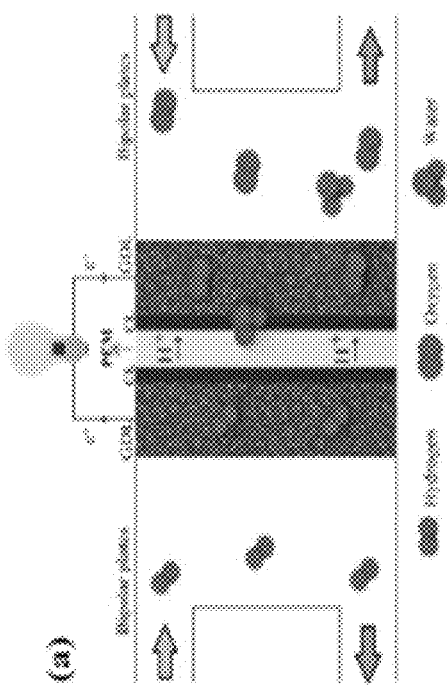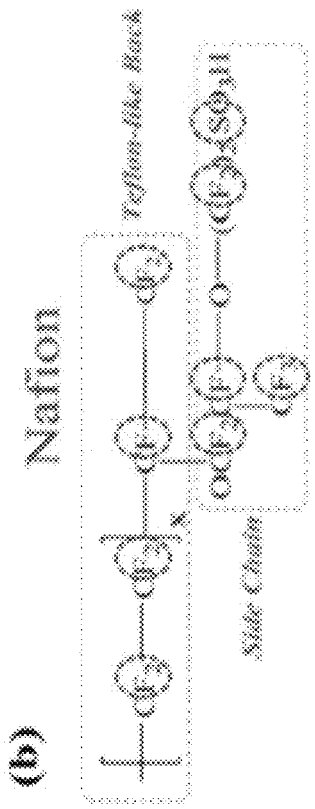
FIG. 1(a)
FIG. 1(b)
FIG. 1(c)

| Sensor data | Type of network | Application |
|---|---|---|
| Vibration sensors (ring and triaxial accelerometer) | ANN | Fault diagnostics of rolling element bearings |
| Frequency spectrum extracted from vibration sensor data | 2D CNN | Fault detection in rotating machines and gearbox |
| Vibration sensor data | 1D CNN | Structural damage detection |
| Multimodal data with 58 sensors on the engine such as temperature and pressure etc | LSTM-RNN | Fault diagnostics and RUL estimation of aero engines |
| Multimodal sensor data from a turbofan engine | LSTM based autoencoder | Sensor data forecasting for RUL |

FIG. 7

SYSTEMS AND METHODS FOR MONITORING FUEL CELL MEMBRANE DEGRADATION

CROSS-REFERENCE TO RELATED APPLICATION

The present application is a divisional application of U.S. Application Ser. No. 18/152,989, filed Jan. 11, 2023, the disclosure of which is hereby incorporated by reference in its entirety, including all figures, tables, and drawings.

GOVERNMENT SUPPORT

This invention was made with government support under DE-AC02-05CH11231 awarded by the Department of Energy. The government has certain rights in the invention.

BACKGROUND

Proton exchange membrane fuel cells (PEMFCs) are the preferred energy source for green transportation, compared to $CO_2$ emitting engines. In Nafion®-based PEMFCs, the radical attack causes polymer chain scission and an irreversible reaction. This results in the global and local thinning of the ionomer, and the radical attack diminishes the performance and stability of the membrane electrode assembly (MEA) of the PEMFC.

BRIEF SUMMARY

Embodiments of the subject invention provide novel and advantageous systems and methods for monitoring (e.g., real-time continuous monitoring) of fuel cell membrane (e.g., fuel cell ionomer) degradation. At least one microsensor (e.g., an ion-sensitive field effect transistor (ISFET)) can be used as an inline sensor integrated at the cathode exhaust and/or the anode exhaust of a fuel cell (e.g., a proton exchange membrane fuel cell (PEMFC)). The microsensor can monitor the PEMFC degradation status by sensing emission of fluoride. The microsensor can include a highly-fluoride-sensitive membrane (e.g., $LaF_3$ and/or $CaF_2$), which can be introduced into a thin layer (e.g., on the order of a few micrometers (μm)) or less) of insulator in the microsensor (e.g., ISFET). Deep learning (DL) methods can be used for microsensor-based predictive maintenance (PM) of the PEMFC. Inline microsensors can perform real-time continuous monitoring of the byproducts, and thus the membrane loss, of the PEMFC in order to realize PM of the PEMFC based on DL.

In an embodiment, a system for monitoring degradation of a fuel cell membrane in a PEMFC can comprise: a first microsensor disposed inline with a first exhaust of the PEMFC, the first microsensor configured for sensing a first analyte that is fluorine or sulfate; a processor in operable communication with the first microsensor; and a machine-readable medium in operable communication with the processor and the first microsensor, and having instructions stored thereon that, when executed by the processor, perform the following steps: monitoring (e.g., by the processor) first sensing data of the first microsensor, the first sensing data comprising a level of the first analyte present in the first exhaust of the PEMFC; and performing (e.g., by the processor) a DL algorithm on the first sensing data to enable PM on the fuel cell membrane of the PEMFC. The first microsensor can be, for example, an ISFET. The first analyte can be fluorine, and the first microsensor (e.g., first ISFET) can comprise a fluoride-sensitive membrane as a thin layer of insulator in the first microsensor. The fluoride-sensitive membrane can comprise $LaF_3$ and/or $CaF_2$. The DL algorithm can comprise a long-short-term memory (LSTM) artificial neural network (ANN). The first exhaust of the PEMFC can be an exhaust of a cathode of the PEMFC or an exhaust of an anode of the PEMFC. The system can further comprise a second microsensor disposed inline with a second exhaust of the PEMFC, the second microsensor configured for sensing a second analyte that is fluorine or sulfate. The instructions when executed can further perform the step of monitoring second sensing data of the second microsensor, the second sensing data comprising a level of the second analyte present in the second exhaust of the PEMFC. The performing of the DL algorithm can comprise performing the DL algorithm on the second sensing data together with the first sensing data to enable PM on the fuel cell membrane of the PEMFC. The second microsensor can be, for example, an ISFET. The second analyte can be fluorine, and the second microsensor (e.g., second ISFET) can comprise a fluoride-sensitive membrane (e.g., comprising $LaF_3$ and/or $CaF_2$) as a thin layer of insulator in the first microsensor. The first exhaust of the PEMFC can be an exhaust of a cathode of the PEMFC, and the second exhaust of the PEMFC can be an exhaust of an anode of the PEMFC. The system can further comprise a display (e.g., in operable communication with the processor) configured to display results of the PM (and/or information related to enabling a user of to monitor and/or perform the PM) on the fuel cell membrane of the PEMFC.

In another embodiment, a method for monitoring degradation of a fuel cell membrane in a PEMFC can comprise: disposing a first microsensor inline with a first exhaust of the PEMFC, the first microsensor configured for sensing a first analyte that is fluorine or sulfate; monitoring, (e.g., by a processor in operable communication with the first microsensor) first sensing data of the first microsensor, the first sensing data comprising a level of the first analyte present in the first exhaust of the PEMFC; and performing (e.g., by the processor) a DL algorithm on the first sensing data to enable PM on the fuel cell membrane of the PEMFC. The first microsensor can be, for example, an ISFET. The first analyte can be fluorine, and the first microsensor (e.g., first ISFET) can comprise a fluoride-sensitive membrane as a thin layer of insulator in the first microsensor. The fluoride-sensitive membrane can comprise $LaF_3$ and/or $CaF_2$. The DL algorithm can comprise a long-short-term memory (LSTM) artificial neural network (ANN). The first exhaust of the PEMFC can be an exhaust of a cathode of the PEMFC or an exhaust of an anode of the PEMFC. The method can further comprise: disposing a second microsensor inline with a second exhaust of the PEMFC, the second microsensor configured for sensing a second analyte that is fluorine or sulfate, and the processor being in operable communication with the second microsensor; monitoring (e.g., by the processor) second sensing data of the second microsensor, the second sensing data comprising a level of the second analyte present in second first exhaust of the PEMFC; and performing (e.g., by the processor) the DL algorithm on the second sensing data together with the first sensing data to enable PM on the fuel cell membrane of the PEMFC. The second microsensor can be, for example, an ISFET. The second analyte can be fluorine, and the second microsensor (e.g., second ISFET) can comprise a fluoride-sensitive membrane (e.g., comprising $LaF_3$ and/or $CaF_2$) as a thin layer of insulator in the first microsensor. The first exhaust of the PEMFC can be an exhaust of a cathode of the PEMFC, and the second exhaust of the PEMFC can be an exhaust of an anode of the PEMFC. The method can further comprise displaying (e.g., on a display in operable communication with the processor) results of the PM (and/or information related to enabling a user to monitor and/or perform the PM) on the fuel cell membrane of the PEMFC.

BRIEF DESCRIPTION OF DRAWINGS

FIG. 1(a) shows a diagram of a proton exchange membrane fuel cell (PEMFC).

FIG. 1(b) shows a diagram of an ionomer with fluoride and sulfate groups.

FIG. 1(c) shows a diagram of a PEMFC measurement setup.

FIG. 7 shows a table of deep learning methods for predictive maintenance of PEMFCs based on type of sensor data. In FIG. 7, 1D, 2D, ANN, CNN, LSTM, RNN, and RUL stand for one-dimensional, two-dimensional, artificial neural network, convolutional neural network, long-short-term memory, recurrent neural network, and remaining useful life, respectively.

DETAILED DESCRIPTION

Figures 2A, 2B, 2C, 2D:
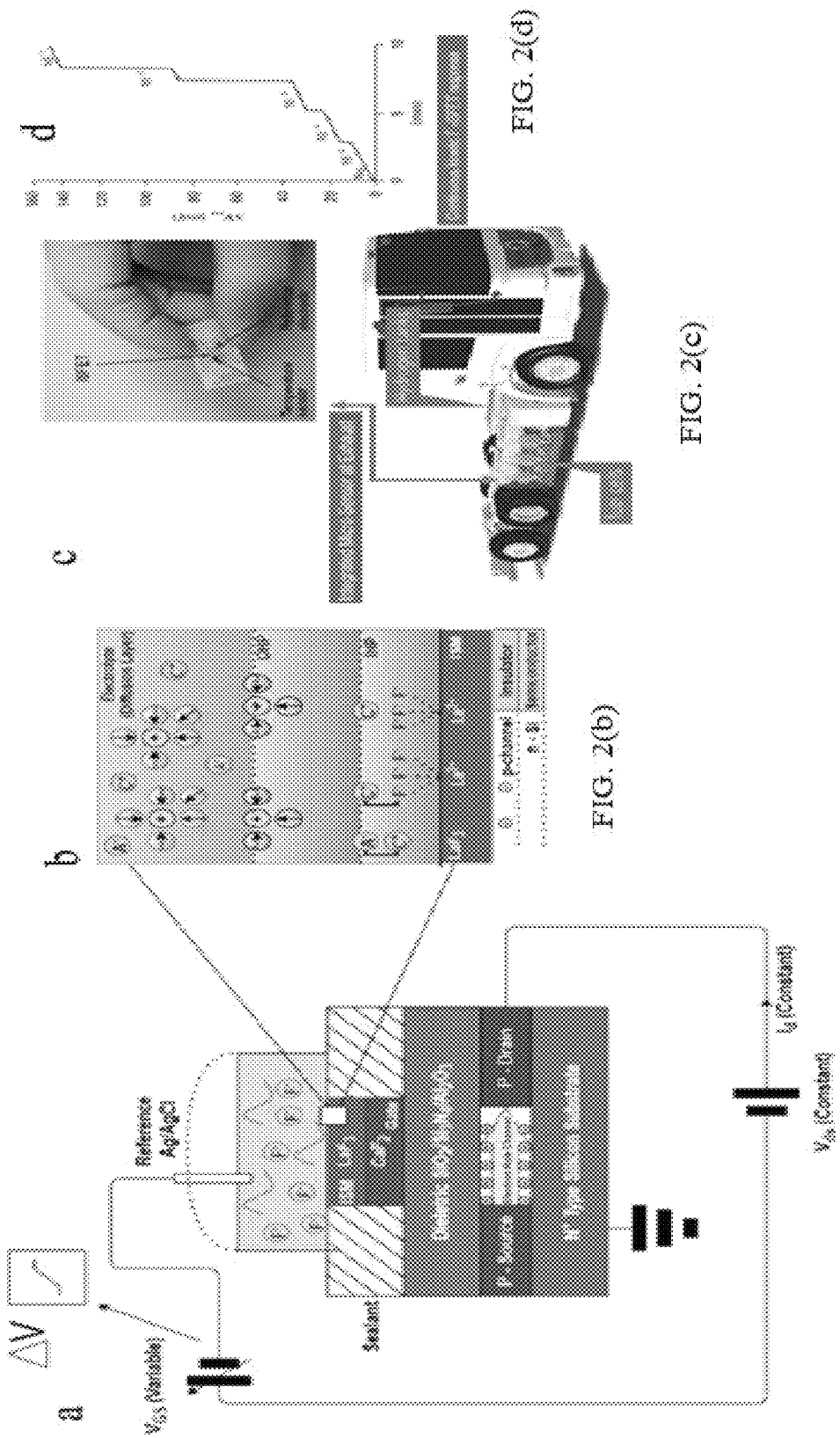
FIG. 2(a) shows a diagram of an ion-sensitive field effect transistor (ISFET) sensor for real-time continuous monitoring, according to an embodiment of the subject invention.
FIG. 2(b) shows a diagram of an interfacial site bonding model for sensing.
FIG. 2(c) shows an image of an integrated ISFET sensor for a PEMFC for a heavy duty vehicle (HDV), according to an embodiment of the subject invention.
FIG. 2(d) shows a plot of ΔV (in millivolts (mV)) versus time (in minutes (min)), showing the kinetics of a fluoride-sensitive ISFET (F-ISFET) response, according to an embodiment of the subject invention.

Embodiments of the subject invention provide novel and advantageous systems and methods for monitoring (e.g., real-time continuous monitoring) of fuel cell membrane (e.g., fuel cell ionomer) degradation. At least one microsensor (e.g., an ion-sensitive field effect transistor (ISFET)) can be used as an inline sensor integrated at the cathode exhaust and/or the anode exhaust of a fuel cell (e.g., a proton exchange membrane fuel cell (PEMFC)). The microsensor can monitor the PEMFC degradation status by sensing emission of fluoride. The microsensor can include a highly-fluoride-sensitive membrane (e.g., $LaF_3$ and/or $CaF_2$), which can be introduced into a thin layer (e.g., on the order of a few micrometers (μm)) or less) of insulator in the microsensor (e.g., ISFET). Deep learning (DL) methods can be used for microsensor-based predictive maintenance (PM) of the PEMFC. Inline microsensors can perform real-time continuous monitoring of the byproducts, and thus the membrane loss, of the PEMFC in order to realize PM of the PEMFC based on DL.

ISFETs are microsensors with low cost, small size, robustness, and the ability for real-time continuous monitoring. In many embodiments, the microsensor can be an ISFET. Highly fluoride-sensitive membranes (e.g., $LaF_3$/$CaF_2$) can be introduced into a thin layer of insulator in the ISFETs. The functionalization of the insulator layer can vary the selectivity/sensitivity of the ISFET. DL can be used for the ISFET-sensor based PM of the PEMFC. In some embodiments, the Internet of Things (IoT) can be employed and can help achieve even more accurate prediction of degradation of the PEMFC.

The radical attack in Nafion®-based PEMFCs results in the global and local thinning of the ionomer, followed by production of fluorinated and sulfated degradation materials into reactant outlet streams. Synchronous fluorinated and sulfated degradation products accumulate in the reactant outlet streams. The chemical degradation increases the flow rate of the relevant fluorinated degradation products, and the concentrations are enhanced at elevated temperatures and lower humidity conditions. The byproduct fluoride and sulfate anion emission rates can be drawn as the signature of the PEMFC degradations. Electrochemical microsensors can be used as diagnostics tools and have low cost, small size, robustness, and applications for real-time continuous monitoring. Embodiments of the subject invention can use fluoride emission as a sensing model (e.g., as an analyte to be sensed). Highly fluoride-sensitive membranes (e.g., $LaF_3$, $CaF_2$, and/or $LaF_3$/$CaF_2$) for microsensors can be used as a sensing active layer, such as on a working electrode. Functionalization of the insulator layer can vary the selectivity/sensitivity of the electrochemical sensor. High sensitivity (e.g., on the order of parts per billion (ppb) or sub ppb) can be achieved after optimizing the sensing layer, which can be deposited by, for example, spin-coating.

An advanced DL algorithm and/or an artificial neural network (ANN) (e.g., long-short-term memory (LSTM)) can be used for sensor-based PM of a PEMFC. Very high sensitivity (e.g., less than 100 parts per trillion (ppt)) and accurate prediction for the end of life of the PEMFC can be achieved. PM is one of the most important diagnostics tools in smart manufacturing and industry. In some embodiments, the IoT can be employed and can help achieve even more accurate prediction of degradation of the PEMFC.

In embodiments of the subject invention, the sensor development and miniaturized portable circuit platform give a complementary approach to diagnostic technique polymers and existing PEMFC characterization. This is critical in view of the widespread use of electric vehicles.

FIG. 1(a) shows a diagram of a PEMFC, and FIG. 1(b) shows an ionomer with fluoride and sulfate groups. Ionomers break down due to the attack of the radicals (e.g., from $H_2O_2$) and are followed by sulfate and fluoride emissions from polymer chains. Instead of analyzing them periodically, embodiments of the subject invention utilize an integrated microsensor to realize real-time continuous monitoring of PEMFCs (e.g., PEMFCs for heavy-duty vehicles (HDVs)). FIG. 1(c) shows a diagram of a PEMFC measurement setup.

FIG. 2(a) shows a diagram of an ISFET sensor for real-time continuous monitoring, according to an embodiment of the subject invention. FIG. 2(b) shows a diagram of an interfacial site bonding model for sensing. FIG. 2(c) shows an image of an integrated ISFET sensor for a PEMFC for an HDV. FIG. 2(d) shows a plot of ΔV (in millivolts (mV)) versus time (in minutes (min)), showing the kinetics of an ISFET response. An ISFET is a solid-state sensor where the gate oxide in the transistor is replaced by an insulating layer and the gate-source voltage (Vus) is linked to the reference electrode (e.g., silver (Ag)/silver chloride (Ag/Cl) (Ag/AgCl)) and interact with the analyte solution (e.g., electrolyte). Variations in ionic concentration result in an increase or decrease in the threshold voltage. The passivation layer functions as the sensing area and determines the specificity and selectivity of the sensor. The site binding model can be used at the interface of the sensor layer and the fuel cell effluent water (see FIG. 2(b)). The dispersion of different charges in the analyte is demonstrated by the Gouy-Chapman-Stern mechanism, and a double layer exists at the interface (see Dutta, 2nd National Conference on Computational Intelligence and Signal Processing (CISP), IEEE, 185-191, 2012; which is hereby incorporated by reference herein in its entirety). This refers to the Stern inner layer and a diffuse layer, and the inner layer can comprise an inner Helmholtz plane (IHP) and an outer Helmholtz plane (OHP) (see FIGS. 2(a) and 2(b)).

A fluoride-sensitive ISFET (F-ISFET) results from the deposition of a functionalized layer (e.g., $LaF_3/CaF_2$) on top of the dielectric layer (e.g., Si, $SiO_2$, $Si_3N_4$) (e.g., directly on and in direct physical contact with the dielectric layer) or on the gate structure (e.g., $Al_2O_3$ gate structure) (e.g., directly on and in direct physical contact with the gate structure). Deposition of $LaF_3$ on the gate isolator results in pF-ISFETs. The continuous kinetic F-ISFET response for successive fluoride additions is shown in FIG. 2(d). The sensitivity of the ISFET can be tuned in the process of optimizing the functionalized area due to the fact that the micro-nanostructure functions as an active center. Fast determination of low fluoride concentration can be achieved with an optimized ISFET. The service life of the ISFET can also be extended by avoiding unnecessary interaction between the gate and the solution. Thus, in various embodiments, the sensor can be an encapsulated microsensor or an extended-gate microsensor. Another aspect in stability of ISFETs relates to the reference electrodes that should be at a stable state by using well-known materials. Ag/AgCl and platinum reaction is preferred in the system. Though the F-ISFET is discussed extensively herein, embodiments of the subject invention are not limited thereto. Other types of microsensors and/or analytes (e.g., sulfate) can be used.

Figure 3A:
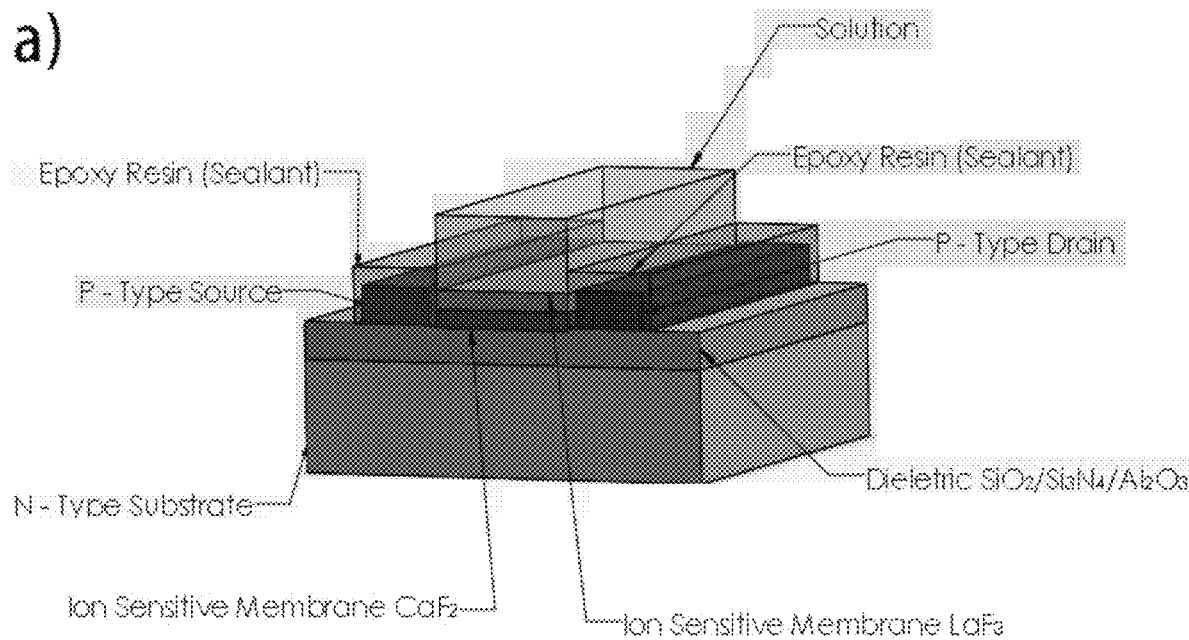
FIG. 3(a) shows a perspective view of an ISFET sensor, according to an embodiment of the subject invention.
Figure 3B:
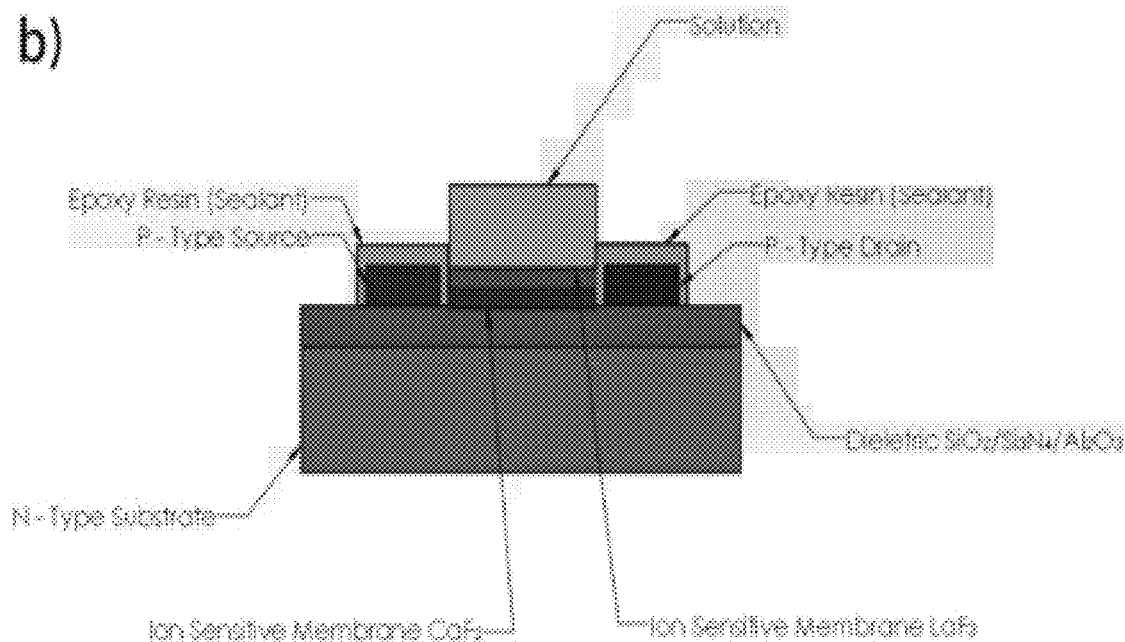
FIG. 3(b) shows a front view of the ISFET sensor of FIG. 3(a).
Figure 3C:
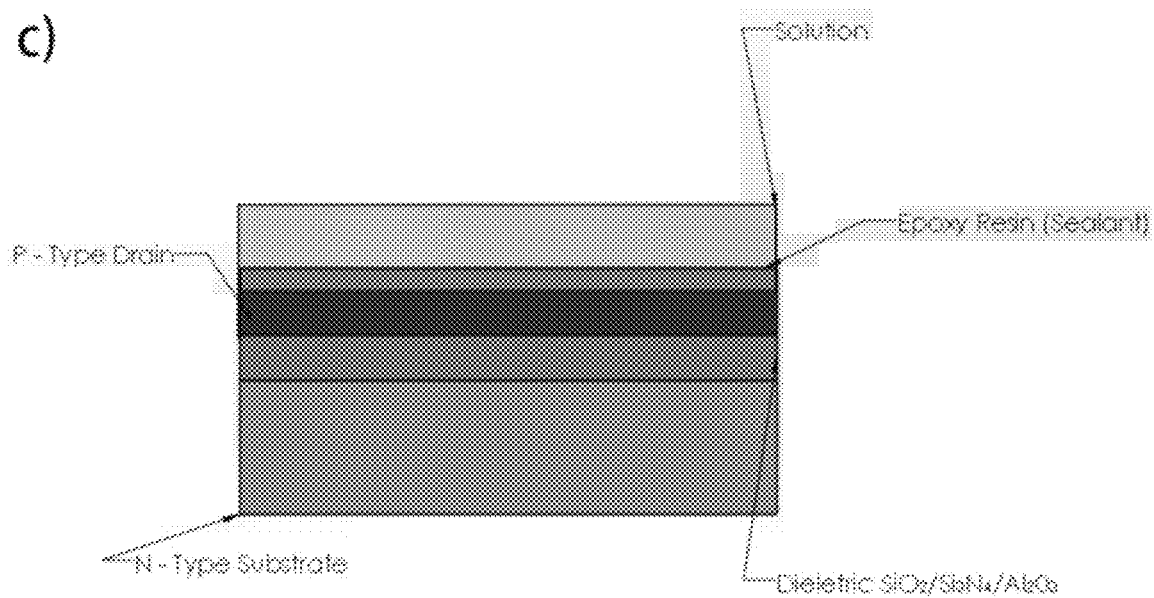
FIG. 3(c) shows a drain-side view of the ISFET sensor of FIG. 3(a).
Figure 3D:
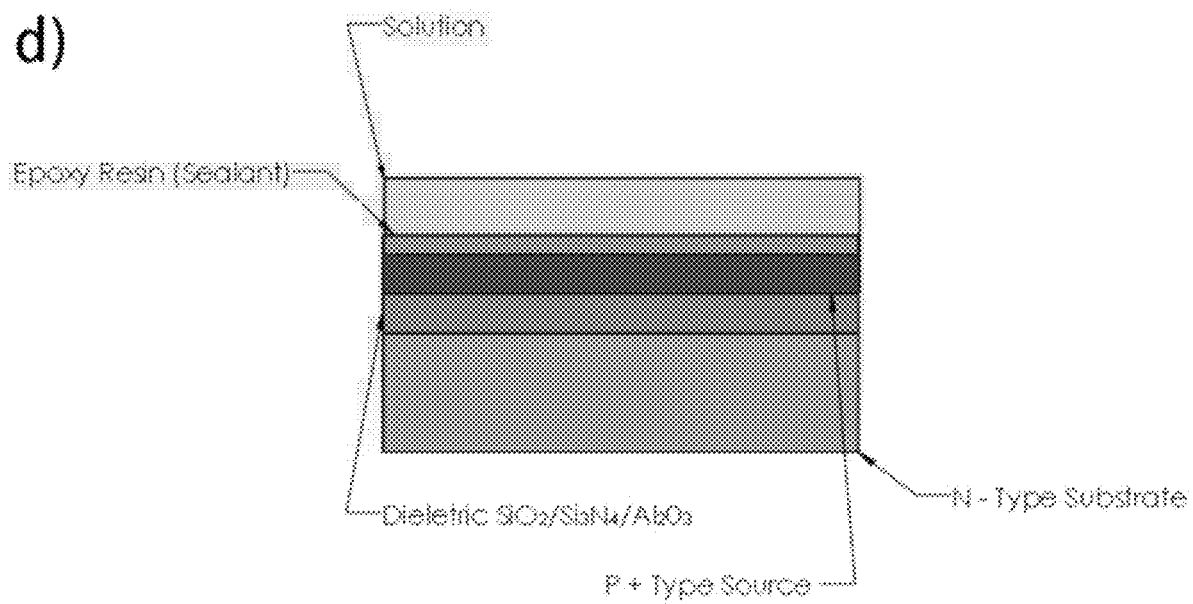
FIG. 3(d) shows a source-side view of the ISFET sensor of FIG. 3(a).
Figure 3E:
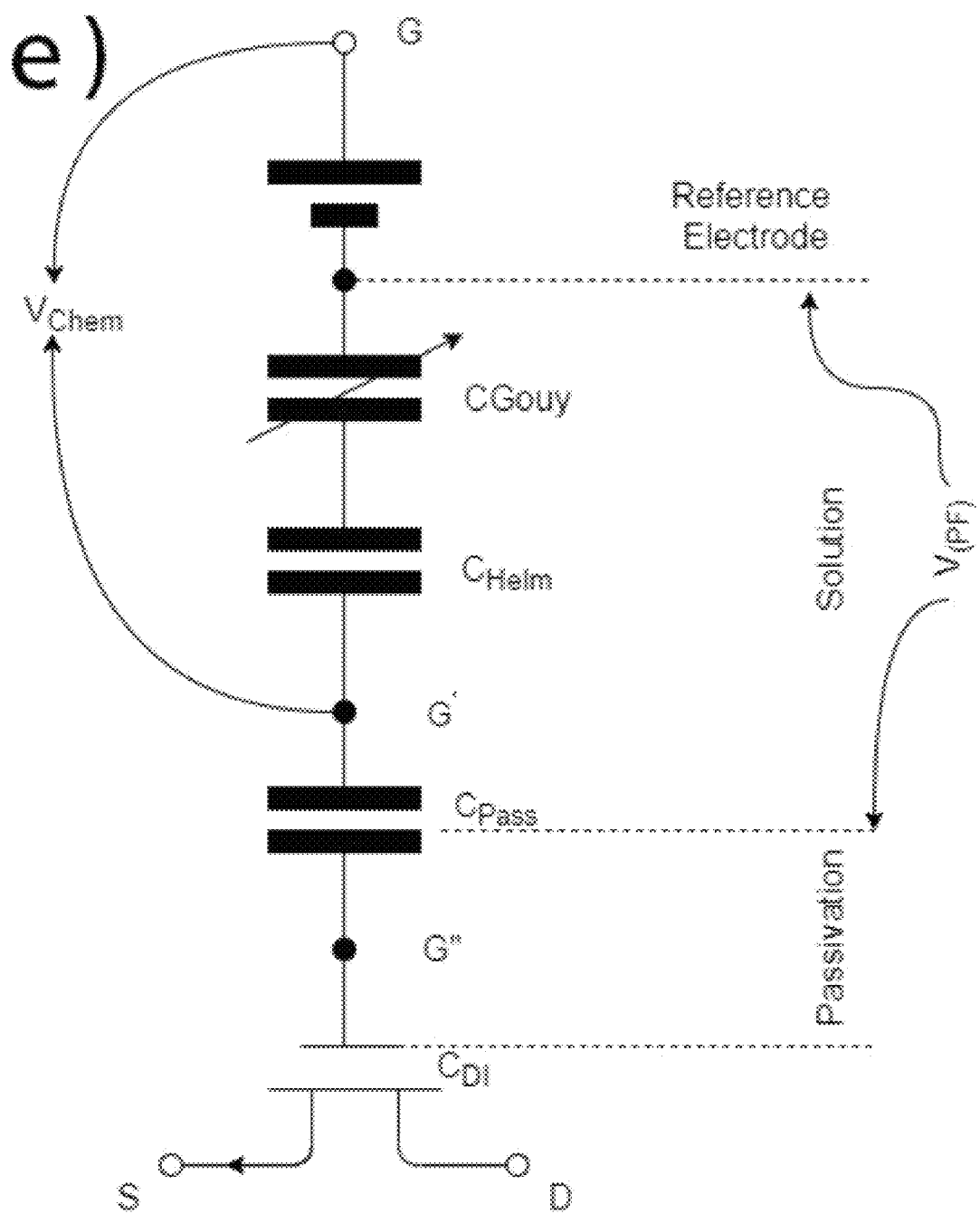
FIG. 3(e) shows an equivalent circuit of the ISFET sensor of FIGS. 3(a)-3(d).

FIGS. 3(a)-3(d) show schematic views (perspective, front, drain-side, and source-side, respectively) of an encapsulated ISFET sensor, according to an embodiment of the subject invention, and FIG. 3(e) shows an equivalent circuit of the ISFET sensor. The gate structure is neighbored by a substrate (e.g., a silicon substrate) and the analyte. The reference electrode and the analyte can replace the metal part of metal oxides in a field effect transistor (FET). With this configuration, the double layer behaves as capacitors in series (Helmholtz capacitance; diffused layer capacitance) as depicted in FIG. 3(e).

Figure 4:
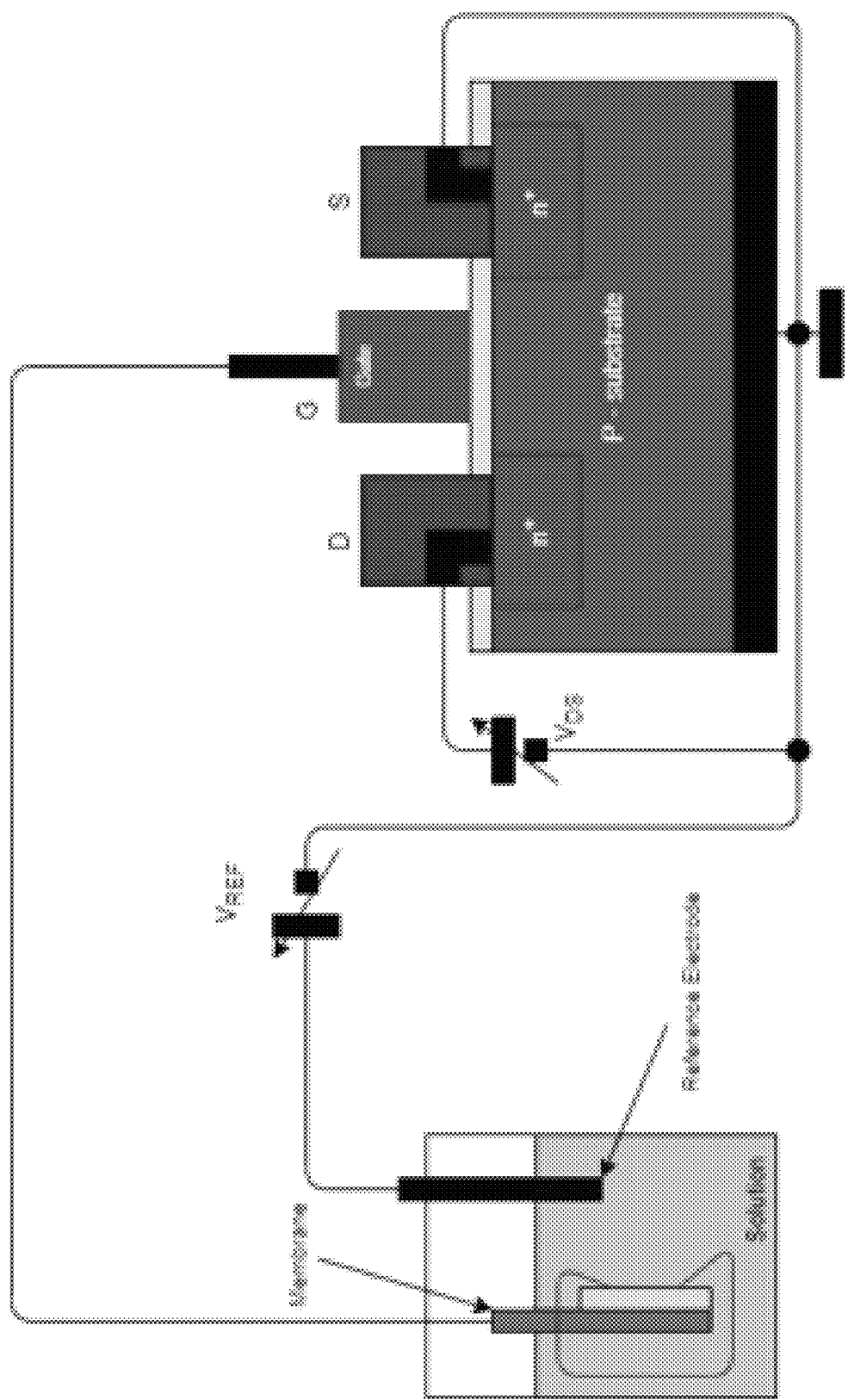
FIG. 4 shows a cross-sectional view of an ISFET sensor, according to an embodiment of the subject invention.

FIG. 4 shows a cross-sectional view of an extended gate ISFET sensor, according to an embodiment of the subject invention. The durability of the ISFET can also be maintained by avoiding the immersion of the full device's gate structure in solution (e.g., effluent water). The device can either be encapsulated (FIGS. 2(a) and 3(a)-3(d)), or the extended gate design can be employed (FIG. 4).

The PEMFC degradation rate can be quantified, for example by measuring concentration of anion (e.g., fluoride). The anions separated from degrading ionomer are focused on fluorinated and sulfonated groups. Signatures are drawn as fluoride emission rate (FER) and sulfate emission rate (SER), and FER in particular can be used to calculate membrane loss (see also Spears et al., Electrochem. Soc., 168, 064503, 2021; which is hereby incorporated herein by reference in its entirety). The membrane loss can be quantified with FER considering the initial weight % of the fluoride in the ionomer. Membrane thickness lost is considered with the loss value (e.g., in grams per square centimeter ($g/cm^2$)) and the density of the ionomer. This can be estimated by the summation of FERs measured over time.

$$FER\left(\frac{\mu g}{cm^2 h^1}\right) = \frac{\text{measured}(ppm)^* \text{amount collected (ml)}}{\text{duration of collection }(h)^* \text{active area }(cm^2)}$$

$$\text{ionomer mass loss }\left(\frac{g}{cm^2}\right) = \frac{\text{ionomer mass loss}}{0.6, \text{weight \% of } F^- \text{ in Ionomer}}$$

$$\text{ionomer thickness loss (cm)} = \frac{\text{fluride emission}}{1.96, \text{Ionomer density}}$$

Figure 5:
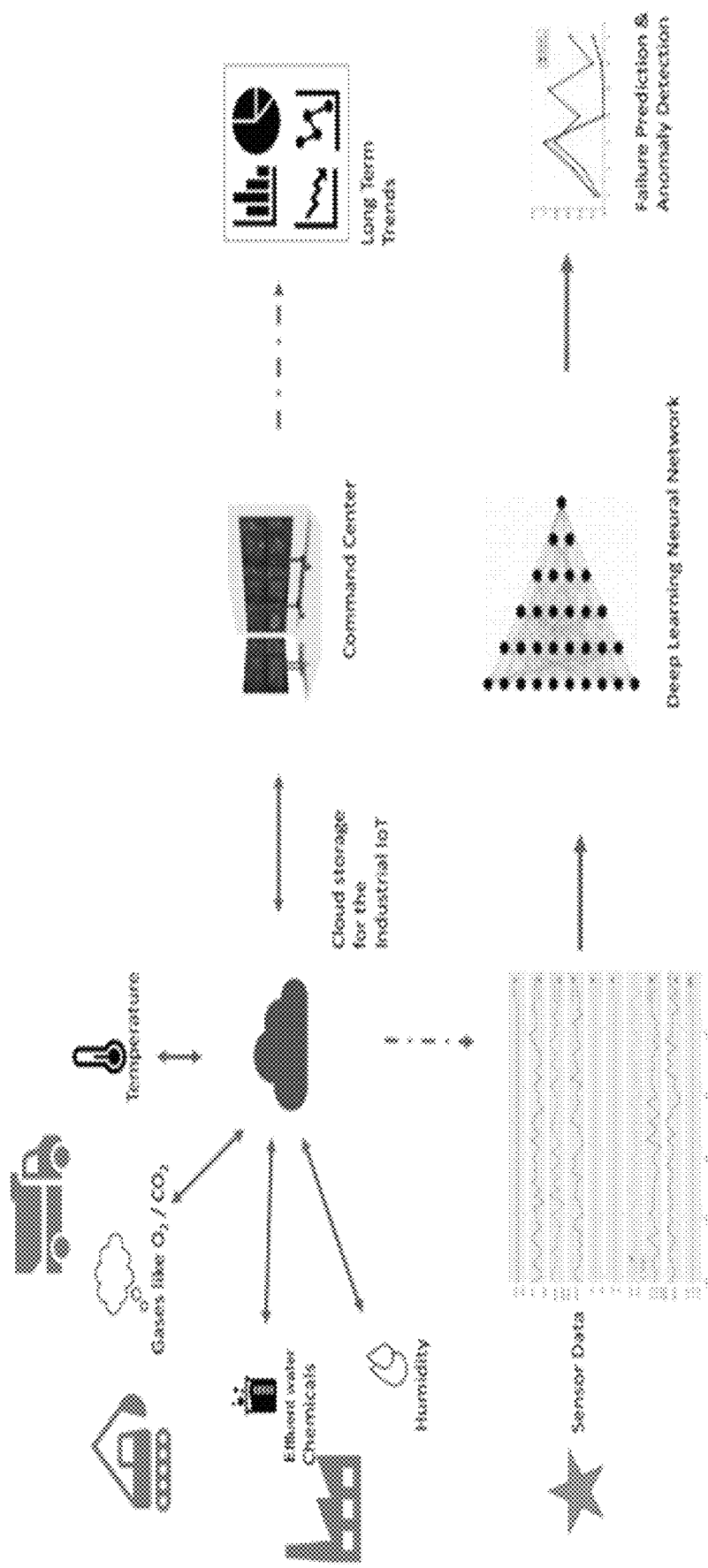
FIG. 5 shows a visualization of a system with data collected from a sensor network based on internet of things (IoT), according to an embodiment of the subject invention.

DL methods can be used for PM of PEMFCs, and the DL can include data collection from the microsensor(s) (e.g., ISFET-based sensor(s)), data transmission and storage, data preprocessing, and data analysis (see also FIG. 5). The DL methods used can be those relevant to sensor-based prediction. Based on the type of sensor data, different types of DL networks for PM can be used, as summarized in the table in FIG. 7 (for more details on DL networks see also Namuduri et al., J. Electrochem. Soc, 167, 037552, 2020; which is hereby incorporated by reference herein in its entirety).

Figure 6:
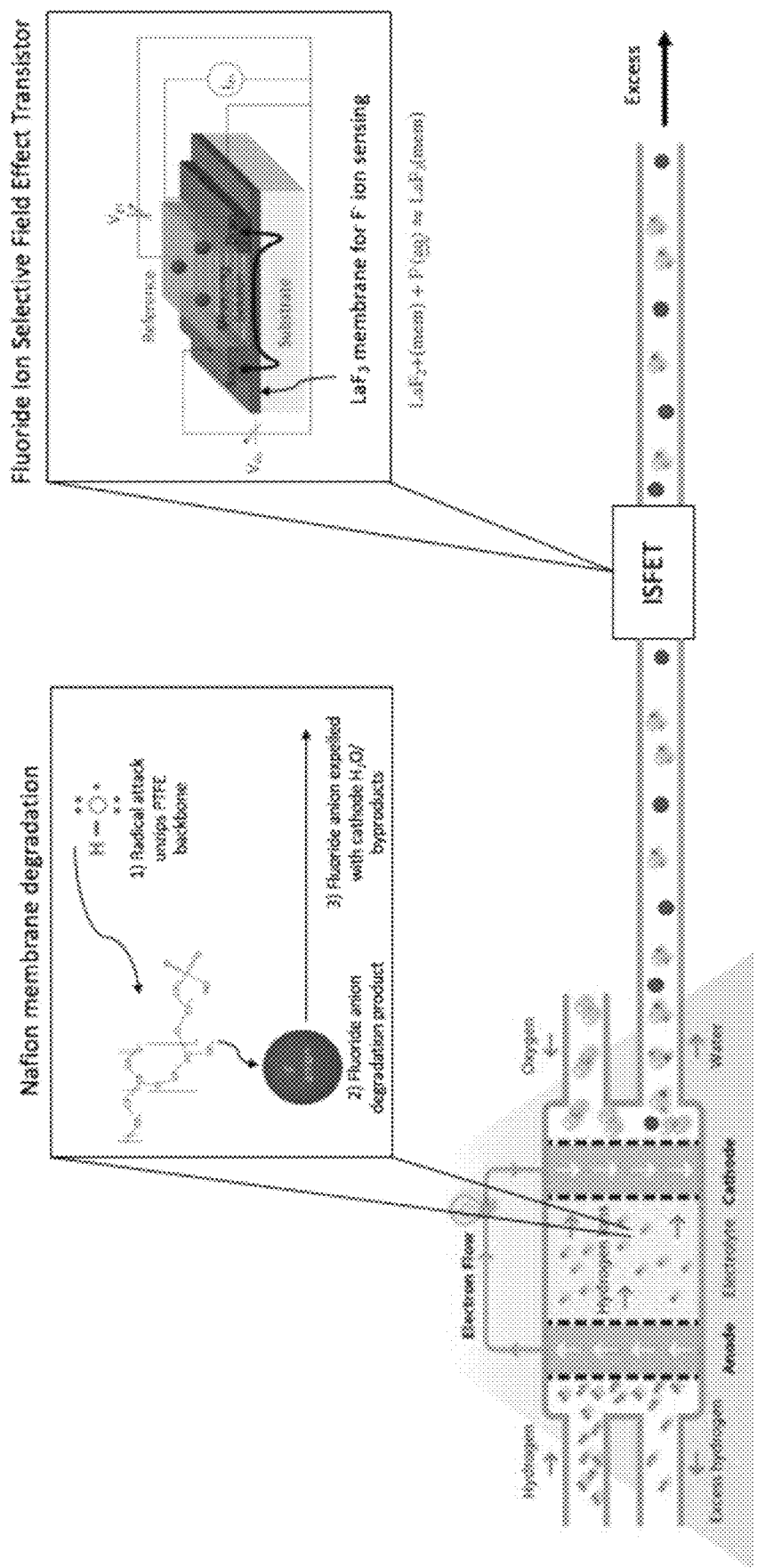
FIG. 6 shows a schematic view of a system including an F-ISFET at the cathode exhaust of a PEMFC, according to an embodiment of the subject invention. The left-most enlarged box shows Nafion membrane degradation that occur in the PEMFC, and the right-most enlarged box shows a close-up view of the F-ISFET, including an $LaF_3$ membrane for fluoride ion ($F^-$) sensing, as well as the mechanism for such sensing ($LaF_2$+(membrane)+$F^-$(aqueous)↔$LaF_3$ (membrane)).

FIG. 6 shows a schematic view of a system including an F-ISFET at the cathode exhaust of a PEMFC, according to an embodiment of the subject invention. The right-most enlarged box shows a close-up view of the F-ISFET, including a $LaF_3$ membrane for fluoride ion ($F^-$) sensing, as well as the mechanism for such sensing ($LaF_2$+(membrane)+$F^-$ (aqueous) H $LaF_3$(membrane)). Referring to FIG. 6, the microsensor can be disposed inline with the exhaust of the cathode (e.g., where water is removed from the cathode side of the PEMFC). The microsensor can detect fluorine ions in the water exhaust. Though an ISFET is depicted, embodiments are not limited thereto. In a further embodiment, a second microsensor (e.g., ISFET) can be disposed inline with the exhaust of the anode (e.g., where excess hydrogen is removed from the anode side of the PEMFC).

Several challenges affect ISFET sensing accuracy, sensitivity, and practicability. One of these issues can be addressed by developing a multimodal sensor and determining how best to analyze the data to gain meaningful process reliability information. In many instances, there is a lack of climate-controlled facilities. The uncontrolled changes (temperature, relative humidity, ionic interference) in the environment can negatively influence the output of sophisticated instruments (e.g., microsensors such as ISFETs), which can result in significant variations in readings over time (e.g., for HDV applications). Embodiments of the subject invention can address these issues by focusing on calibration. A multimodal technique can be used to inhibit or eliminate interference. Open circuit potential (OCP) and/or voltammetric techniques can be incorporated and can be applied to improve the detection of specific systems where such disturbances exist. The signal-to-noise ratio (SNR) can be improved, and the sensor can be interfaced with a miniaturized potentiostat, controlled through a microcontroller to implement an auto-calibration algorithm tailored to improve the specific analytic fluoride and/or sulfate detection. Multimodal electrochemical techniques can eliminate the voltage signal of the interfering phase. In addition, or alternatively, multivariate calibration methods can be used. Advanced data analysis principal component regression (PCR) can be implemented to establish the relationship between response variables and predictor variables to improve the calibration. Larger data sets can be highly correlated, and the fitting between known and unknown data can also be enhanced with PCR.

Embodiments of the subject invention provide miniaturized, portable, user-friendly diagnostics tools for quantitative analysis of fuel cell (e.g., PEMFC) degradation. Such tools are helpful for indicating to users when to maintain the fuel cell membrane (e.g., for a fuel cell of an electric vehicle such as an electric HDV). The microsensor(s) can be integrated with the fuel cell vehicles design (see, e.g., FIG. 3). The related art includes no specific diagnostics tool for membrane maintenance in fuel cells for electric vehicles.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., sub-ranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for monitoring degradation of a fuel cell membrane in a proton exchange membrane fuel cell, the system comprising:
    a first microsensor disposed inline with a first exhaust of the proton exchange membrane fuel cell, the first microsensor configured for sensing a first analyte that is fluorine or sulfate;
    a processor in operable communication with the first microsensor; and
    a machine-readable medium in operable communication with the processor and the first microsensor, and having instructions stored thereon that, when executed by the processor, perform the following steps:
        monitoring first sensing data of the first microsensor, the first sensing data comprising a level of the first analyte present in the first exhaust of the proton exchange membrane fuel cell; and
        performing a deep learning algorithm on the first sensing data to enable predictive maintenance on the fuel cell membrane of the proton exchange membrane fuel cell.

2. The system according to claim 1, the first microsensor being an ion-sensitive field effect transistor.

3. The system according to claim 2, the first analyte being fluorine, and
    the ion-sensitive field effect transistor comprising a fluoride-sensitive membrane as a thin layer of insulator in the first microsensor.

4. The system according to claim 3, the fluoride-sensitive membrane comprising at least one of $LaF_3$ and $CaF_2$.

5. The system according to claim 4, the fluoride-sensitive membrane comprising $LaF_3$.

6. The system according to claim 4, the fluoride-sensitive membrane comprising $CaF_2$.

7. The system according to claim 1, the first analyte being fluorine, and the first microsensor comprising a fluoride-sensitive membrane as a thin layer of insulator in the first microsensor.

8. The system according to claim 7, the fluoride-sensitive membrane comprising at least one of $LaF_3$ and $CaF_2$.

9. The system according to claim 8, the fluoride-sensitive membrane comprising $LaF_3$.

10. The system according to claim 8, the fluoride-sensitive membrane comprising $CaF_2$.

11. The system according to claim 1, the deep learning algorithm comprising a long-short-term memory artificial neural network.

12. The system according to claim 1, the first exhaust of the proton exchange membrane fuel cell being an exhaust of a cathode of the proton exchange membrane fuel cell.

13. The system according to claim 1, the first analyte being fluorine,
the first microsensor being configured to detect fluorine ions in the first exhaust of the proton exchange membrane fuel cell, based on interaction of the fluorine ions with a fluoride-sensitive membrane of the first microsensor, to give the first sensing data, and
the first microsensor being configured to transmit the first sensing data to the processor for monitoring.

14. The system according to claim 1, further comprising a second microsensor disposed inline with a second exhaust of the proton exchange membrane fuel cell, the second microsensor configured for sensing a second analyte that is fluorine or sulfate,
the instructions when executed further performing the step of monitoring second sensing data of the second microsensor, the second sensing data comprising a level of the second analyte present in the second exhaust of the proton exchange membrane fuel cell, and
the performing of the deep learning algorithm comprising performing the deep learning algorithm on the second sensing data together with the first sensing data to enable predictive maintenance on the fuel cell membrane of the proton exchange membrane fuel cell.

15. The system according to claim 14, the first exhaust of the proton exchange membrane fuel cell being an exhaust of a cathode of the proton exchange membrane fuel cell, and
the second exhaust of the proton exchange membrane fuel cell being an exhaust of an anode of the proton exchange membrane fuel cell.

16. The system according to claim 14, the first analyte being fluorine,
the first microsensor being configured to detect fluorine ions in the first exhaust of the proton exchange membrane fuel cell based on interaction of the fluorine ions with a fluoride-sensitive membrane of the first microsensor, to give the first sensing data,
the first microsensor being configured to transmit the first sensing data to the processor for monitoring,
the second microsensor being configured to detect fluorine ions in the second exhaust of the proton exchange membrane fuel cell, based on interaction of the fluorine ions with a fluoride-sensitive membrane of the second microsensor, to give the second sensing data, and
the second microsensor being configured to transmit the second sensing data to the processor for monitoring.

17. A system for monitoring degradation of a fuel cell membrane in a proton exchange membrane fuel cell, the system comprising:
a first microsensor disposed inline with an exhaust of a cathode of the proton exchange membrane fuel cell, the first microsensor configured for sensing a first analyte that is fluorine;
a second microsensor disposed inline with an exhaust of an anode of the proton exchange membrane fuel cell, the second microsensor configured for sensing a second analyte that is fluorine;
a processor in operable communication with the first microsensor and the second microsensor; and
a machine-readable medium in operable communication with the processor, the first microsensor, and the second microsensor, and having instructions stored thereon that, when executed by the processor, perform the following steps:
monitoring first sensing data of the first microsensor, the first sensing data comprising a level of the first analyte present in the exhaust of the cathode;
monitoring second sensing data of the second microsensor, the second sensing data comprising a level of the second analyte present in the exhaust of the anode; and
performing a deep learning algorithm on the first sensing data and the second sensing data to enable predictive maintenance on the fuel cell membrane of the proton exchange membrane fuel cell
the first microsensor being an ion-sensitive field effect transistor comprising a first fluoride-sensitive membrane as a thin layer of insulator in the first microsensor,
the second microsensor being an ion-sensitive field effect transistor comprising a second fluoride-sensitive membrane as a thin layer of insulator in the second microsensor,
the first fluoride-sensitive membrane comprising at least one of $LaF_3$ and $CaF_2$,
the second fluoride-sensitive membrane comprising at least one of $LaF_3$ and $CaF_2$, and
the deep learning algorithm comprising a long-short-term memory artificial neural network.

18. The system according to claim 17, the first microsensor being configured to detect fluorine ions in the exhaust of the cathode of the proton exchange membrane fuel cell based on interaction of the fluorine ions with the first fluoride-sensitive membrane of the first microsensor, to give the first sensing data,
the first microsensor being configured to transmit the first sensing data to the processor for monitoring,
the second microsensor being configured to detect fluorine ions in the exhaust of the anode of the proton exchange membrane fuel cell, based on interaction of the fluorine ions with the second fluoride-sensitive membrane of the second microsensor, to give the second sensing data, and
the second microsensor being configured to transmit the second sensing data to the processor for monitoring.

19. The system according to claim 17, the fluoride-sensitive membrane comprising $LaF_3$.

20. The system according to claim 17, the fluoride-sensitive membrane comprising $CaF_2$.

* * * * *